(12) United States Patent
Greenhill et al.

(10) Patent No.: US 9,420,234 B2
(45) Date of Patent: Aug. 16, 2016

(54) VIRTUAL OBSERVER

(75) Inventors: Stewart Ellis Smith Greenhill, Hilton (AU); Svetha Venkatesh, Winthrop (AU)

(73) Assignee: VIRTUAL OBSERVER PTY LTD, Western Australia (AU)

( * ) Notice: Subject to any disclaimer, the term of this patent is extended or adjusted under 35 U.S.C. 154(b) by 991 days.

(21) Appl. No.: 12/297,118

(22) PCT Filed: Apr. 13, 2007

(86) PCT No.: PCT/AU2007/000483
§ 371 (c)(1),
(2), (4) Date: Oct. 14, 2008

(87) PCT Pub. No.: WO2007/118272
PCT Pub. Date: Oct. 25, 2007

(65) Prior Publication Data
US 2009/0073265 A1    Mar. 19, 2009

(30) Foreign Application Priority Data

Apr. 13, 2006  (AU) ............................... 2006901978

(51) Int. Cl.
*H04N 7/18* (2006.01)
*G08B 13/196* (2006.01)

(52) U.S. Cl.
CPC ............ *H04N 7/18* (2013.01); *G08B 13/19647* (2013.01)

(58) Field of Classification Search
CPC ............................ H04N 7/18; G08B 13/19647
USPC ................... 348/148, 143, 153, 159, 161, 129
See application file for complete search history.

(56) References Cited

U.S. PATENT DOCUMENTS

| | | | | |
|---|---|---|---|---|
| 5,321,396 A | * | 6/1994 | Lamming et al. | 340/8.1 |
| 5,666,157 A | * | 9/1997 | Aviv | 348/152 |
| 5,731,785 A | * | 3/1998 | Lemelson et al. | 342/357.31 |
| 5,790,181 A | * | 8/1998 | Chahl et al. | 348/36 |
| 6,028,626 A | * | 2/2000 | Aviv | 348/152 |
| 6,037,977 A | * | 3/2000 | Peterson | 348/148 |
| 6,154,251 A | | 11/2000 | Taylor | |
| 6,243,483 B1 | * | 6/2001 | Petrou et al. | 382/103 |
| 6,587,601 B1 | * | 7/2003 | Hsu et al. | 382/294 |
| 6,597,818 B2 | * | 7/2003 | Kumar et al. | 382/294 |
| 6,697,103 B1 | * | 2/2004 | Fernandez et al. | 348/143 |
| 6,985,620 B2 | * | 1/2006 | Sawhney et al. | 382/154 |
| 6,987,451 B2 | * | 1/2006 | McKeown et al. | 340/541 |

(Continued)

FOREIGN PATENT DOCUMENTS

| | | |
|---|---|---|
| WO | 96/03839 A1 | 2/1996 |
| WO | 0197524 A1 | 12/2001 |
| WO | 2005/120071 A2 | 12/2005 |

OTHER PUBLICATIONS

International Search Report for PCT/AU2007/000483.

*Primary Examiner* — Hua Fan
(74) *Attorney, Agent, or Firm* — Brooks Kushman P.C.

(57) ABSTRACT

This invention concerns wide-area video surveillance systems. In a first aspect the invention is a surveillance network, in another aspect the invention is a virtual observer, and in a further aspect the invention is a method for operating a virtual observer. Each segments or frame of video, from each camera of the network is associated with the following trajectory parameters; a time and a spatial position, and possibly a radius, orientation, resolution and field of view, and stored for later recall.

12 Claims, 14 Drawing Sheets

(56) References Cited

U.S. PATENT DOCUMENTS

| | | | |
|---|---|---|---|
| 7,131,136 B2* | 10/2006 | Monroe | 725/105 |
| 7,183,549 B2* | 2/2007 | Teich et al. | 250/330 |
| 7,283,687 B2* | 10/2007 | Bodin et al. | 382/305 |
| 7,511,612 B1* | 3/2009 | Monroe | 340/521 |
| 7,540,011 B2* | 5/2009 | Wixson et al. | 725/52 |
| 7,574,019 B2* | 8/2009 | Mittal et al. | 382/103 |
| 7,675,520 B2* | 3/2010 | Gee et al. | 345/473 |
| 7,697,028 B1* | 4/2010 | Johnson | 348/148 |
| 7,920,626 B2* | 4/2011 | Fernandez et al. | 375/240.16 |
| 8,200,700 B2* | 6/2012 | Moore et al. | 707/791 |
| 2001/0010541 A1* | 8/2001 | Fernandez et al. | 348/143 |
| 2001/0038718 A1* | 11/2001 | Kumar et al. | 382/284 |
| 2001/0043738 A1* | 11/2001 | Sawhney et al. | 382/154 |
| 2002/0094135 A1* | 7/2002 | Caspi et al. | 382/294 |
| 2002/0111727 A1* | 8/2002 | Vanstory et al. | 701/33 |
| 2002/0175832 A1* | 11/2002 | Mizusawa et al. | 340/932.2 |
| 2003/0028848 A1* | 2/2003 | Choi | 715/500.1 |
| 2003/0061617 A1* | 3/2003 | Bodin et al. | 725/86 |
| 2003/0174773 A1* | 9/2003 | Comaniciu et al. | 375/240.08 |
| 2004/0016870 A1* | 1/2004 | Pawlicki et al. | 250/208.1 |
| 2004/0023722 A1* | 2/2004 | Vuong et al. | 463/40 |
| 2004/0027453 A1* | 2/2004 | Hasegawa et al. | 348/143 |
| 2004/0032495 A1* | 2/2004 | Ortiz | 348/157 |
| 2004/0075663 A1* | 4/2004 | Plante | 345/474 |
| 2004/0095374 A1* | 5/2004 | Jojic et al. | 345/716 |
| 2004/0105005 A1* | 6/2004 | Yamamoto et al. | 348/159 |
| 2004/0119591 A1* | 6/2004 | Peeters | 340/539.26 |
| 2004/0130620 A1* | 7/2004 | Buehler et al. | 348/143 |
| 2004/0131249 A1* | 7/2004 | Sandrew | 382/162 |
| 2004/0160317 A1* | 8/2004 | McKeown et al. | 340/522 |
| 2005/0031169 A1* | 2/2005 | Shulman et al. | 382/104 |
| 2005/0105765 A1* | 5/2005 | Han et al. | 382/100 |
| 2005/0132414 A1* | 6/2005 | Bentley et al. | 725/105 |
| 2005/0151846 A1 | 7/2005 | Thornhill | |
| 2005/0206741 A1 | 9/2005 | Raber | |
| 2005/0206784 A1* | 9/2005 | Li et al. | 348/441 |
| 2006/0242199 A1* | 10/2006 | Cobleigh et al. | 707/104.1 |
| 2007/0053513 A1* | 3/2007 | Hoffberg | 380/201 |
| 2007/0061266 A1* | 3/2007 | Moore et al. | 705/51 |
| 2007/0061487 A1* | 3/2007 | Moore et al. | 709/246 |
| 2007/0070069 A1* | 3/2007 | Samarasekera et al. | 345/427 |
| 2007/0092245 A1* | 4/2007 | Bazakos et al. | 396/427 |
| 2007/0146372 A1* | 6/2007 | Gee et al. | 345/474 |
| 2007/0219686 A1* | 9/2007 | Plante | 701/35 |
| 2007/0276561 A1* | 11/2007 | Tripathi et al. | 701/30 |
| 2007/0279494 A1* | 12/2007 | Aman et al. | 348/169 |
| 2008/0221745 A1* | 9/2008 | Diamandis et al. | 701/3 |
| 2009/0092334 A1* | 4/2009 | Shulman et al. | 382/284 |
| 2009/0113505 A1* | 4/2009 | Yu | 725/114 |
| 2009/0276105 A1* | 11/2009 | Lacaze et al. | 701/2 |
| 2010/0002082 A1* | 1/2010 | Buehler et al. | 348/159 |
| 2010/0096491 A1* | 4/2010 | Whitelaw et al. | 244/15 |
| 2010/0201829 A1* | 8/2010 | Skoskiewicz et al. | 348/211.2 |
| 2011/0095908 A1* | 4/2011 | Nadeem et al. | 340/905 |
| 2012/0166080 A1* | 6/2012 | Hung et al. | 701/448 |
| 2012/0213185 A1* | 8/2012 | Frid | 370/329 |
| 2013/0302755 A1* | 11/2013 | Voorhees et al. | 434/30 |

\* cited by examiner (a)

(b)

(c)

VIRTUAL OBSERVER

TECHNICAL FIELD

This invention concerns wide-area video surveillance systems. In a first aspect the invention is a surveillance network, in another aspect the invention is a virtual observer, and in a further aspect the invention is a method for operating a virtual observer.

BACKGROUND ART

Current wide area video surveillance systems generally consist of a network of fixed cameras. This requires the cameras to be set up close to locations of interest within the wide area.

More recently, cameras have been placed on board buses and other mobile platforms for internal and external security reasons. Similar vehicle mounted "Mobile" cameras are also used to make observations in unmanned aerial and undersea surveys, and in other harsh or dangerous situations.

DISCLOSURE OF THE INVENTION

In a first aspect the invention is a wide area video surveillance network comprising plural cameras to observe places where people typically live and interact, wherein each segment or frame of video is stored for later recall in association with the following trajectory parameters: a time and a spatial position, and possibly orientation, resolution and field of view.

The network may comprise one or more mobile cameras, and these may be distributed in a fleet of vehicles, say buses, trains, law enforcement vehicles or taxis. In each case the vehicle may be fitted with one or more cameras having internal or external views, or both. A camera with an external view may be directed to record the scene looking forward, rearward or sideways.

The network may comprise one or more static cameras, and these may be located at known locations, for instance attached to buildings. The location of a static camera may be determined by, say, GPS at the time of installation.

A date and time stamp may be recorded with each segment, from a local on board clock.

The position information recorded with each segment or frame may be obtained from GPS or inertial navigation devices.

The orientation of each camera may be fixed relative to the vehicle or they may be moveable, for example to sweep from side-to-side or to track particular objects, perhaps a building, that the vehicle passes. The orientation information may be interpolated from location data or derived from a complementary orientation sensor.

The resolution information may be determined from the properties of the camera, or recorded when the camera is set up.

The field of view information may be determined from the properties of the camera, or recorded when the camera is set up. The field of view information may be interpolated from location data, or inferred from an image or images captured by the camera.

The information recorded by the network of mobile cameras represents a large collection of sample images across a large spatial area at low temporal resolution. So, views of a particular location are distributed across many different video streams. By recalling the information stored according to the invention, it is possible to create a view from an imaginary camera located at any point in the network, in particular a composite view can be constructed from segments or frames recorded at different times, or from different cameras, or both. This information can be used to construct a number of different types of views.

The point in the network at which the imaginary camera is located may also be defined to have the following observation parameters: a position, radius, orientation, resolution and field of view. These five parameters are then used to construct a query to recall segments or frames of video from storage.

The storage may keep data streams collected from cameras distributed between multiple mobile vehicles. The recalled segments or frames can then be used to synthesize a view to display. Synthesis may involve Image Stitching or "mosaicing".

In another aspect the invention is a virtual observer in a wide area video surveillance network, comprising a computer having access to recall segments or frames of video recorded and stored, and a monitor on which it displays a view constructed from segments or frames recorded at different times, or from different cameras, or both.

The segments or frames are associated with the trajectory parameters of time and spatial position. This information can be used to construct a number of different types of views. The different types of views may include:

The view from a virtual observer given a source position, radius, orientation, resolution and field of view.
  Panoramic views where the desired field of view is wider than the camera view. In this type of view, multiple images taken at different times are combined to give a wide-angle perspective view.
  "Time-lapse" views showing how a view of a place changes over time.
  Views of a particular object or landmark. Given a destination position and range of view angles, matching images can be retrieved on the basis of simple visibility constraints.
  Views selected on the basis of multiple spatial, temporal and geometric constraints. For example, images may be selected by choosing a position from a map, or by a temporal constraint based on absolute time, or time-of-day.

In a further aspect the invention is a method of operating a virtual observer in a wide area video surveillance network, comprising the following steps:

Receiving an input of the location of the virtual observer on a map of the network.
  Receiving an input of the query operators and observation parameters for the location.
  Determining trajectory parameters corresponding to the specified location, query operators and observation parameters;
  Recalling stored segments or frames of video associated with the determined trajectory parameters; and,
  Synthesizing a view to be displayed from the recalled video segments or frames.

The query operators may include one or more of the following:

A closest observation query that returns a segments or frame taken from the closest point to a defined location.
  A view towards a place that returns segments or frames that view a defined location.
  A view from a place that returns segments or frames looking outward from a defined location.
  And, a view of a large spatial region that returns segments or frames captured in the region.

The recalling step may further includes an operation to merge segments or frames of video captured using plural cameras for a particular query operator. The operation may also merge segments or frames of video captured using one camera for plural query operators.

Additionally, the view displayed may be updated from time to time, as the query results may be adaptively refined as more data is made available.

Advantageously, the invention is capable of querying and retrieving data that is:
- multi-modal, with temporal and spatial information;
- distributed between static and mobile platforms;
- semi-permanent, in that many of the storage units have to be reused frequently;
- available in parts, in that some data to answer a query may have been retrieved and thus available, whilst some data may have to be retrieved on demand; and,
- retrievable on demand from plural mobile devices.

BRIEF DESCRIPTION OF THE DRAWINGS

Examples of the invention will now be described with reference to the accompanying drawings, in which.

BEST MODES OF THE INVENTION

Surveillance Network

Figure 1:
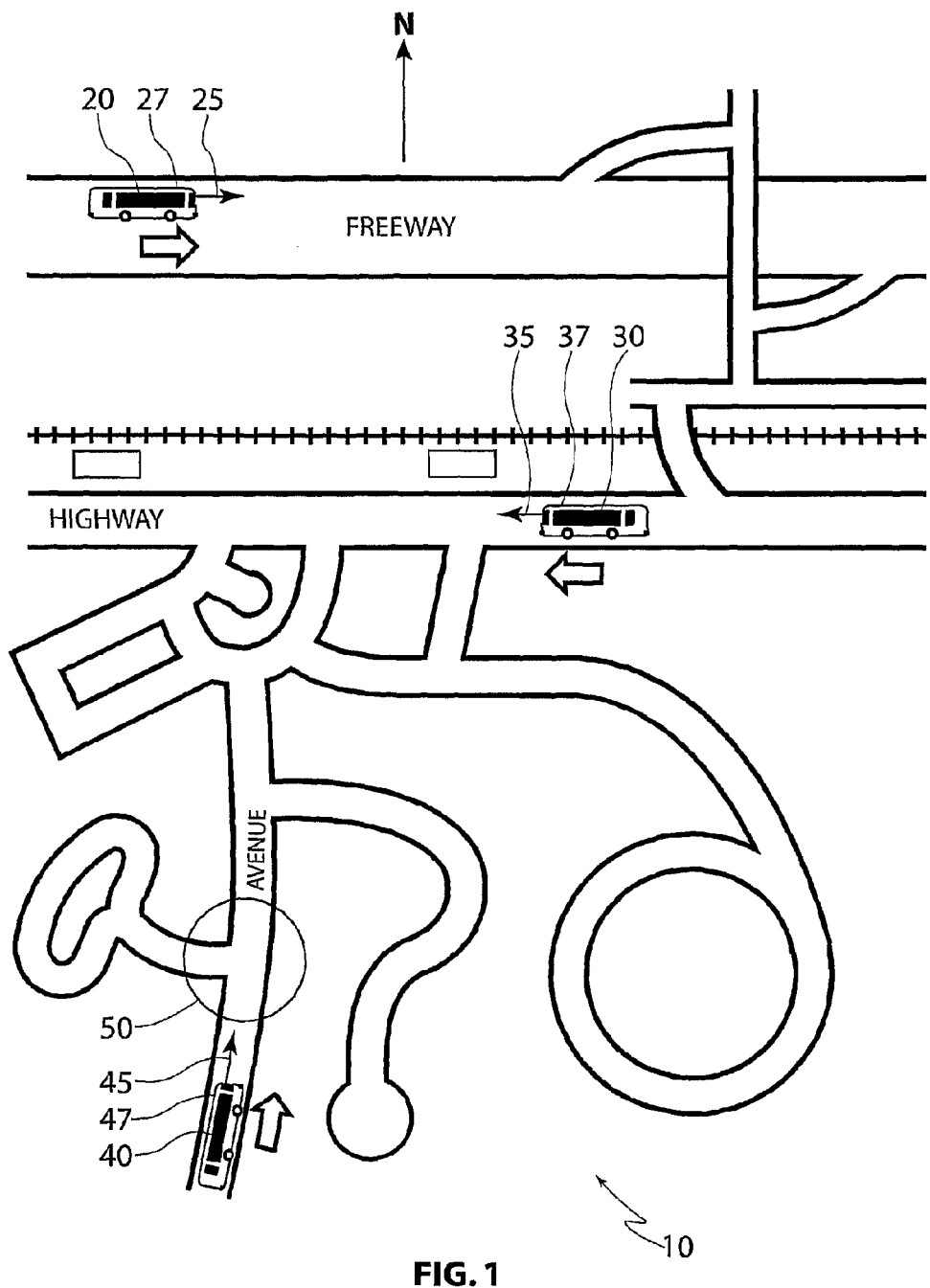
FIG. 1 is a schematic diagram of a surveillance network.

Referring first to FIG. 1 a surveillance network 10 is shown distributed over a suburb. The network 10 comprises a number of buses that enter the suburb, follow routes around the suburb and then leave. At the particular moment in time shown, a first bus 20 is approaching the suburb from the west on the freeway. A second bus 30 is in the suburb and travelling westward along the highway. The third bus 40 is travelling north on an avenue.

All three buses 20, 30 and 40 are fitted with a video camera 25, 35, and 45 respectively, and each camera observes the forward looking scene. The cameras also record the scene with a given frame rate. Each bus is also fitted with a GPS receiver 27, 37 and 47 respectively. As each video frame is stored, for instance on video tape, DVD, or hard disk drive, it is marked with the time, spatial location and compass orientation. This storage technique facilitates subsequent interpolation of the camera's orientation relative to the vehicle, and the trajectory of the vehicle at any given time.

The internal cameras are used primarily for security purposes. Since the cameras that face externally may be required to record objects that are distant and moving rapidly, the frame rate and resolution requirements for these cameras are generally higher than for the internal cameras.

It will be appreciated that the mobile cameras 25, 35 and 45 have variable position and orientation and sample a large spatial area but at low temporal resolution. Additionally, the views of any particular place are distributed across many different video streams; from different buses. Each bus has sufficient video storage to hold several days of data. All the video streams are uploaded from the buses at regular intervals when they return to depot, and the data is then stored at a central location.

The cameras with external views may only operate when the bus passes locations where a virtual observer has been placed. As the bus goes past a short segment of high resolution video is captured. This selective filming greatly reduces the amount of data stored and uploaded.

As vehicles move around the environment, their trajectory is recorded via GPS. Each camera attached to a vehicle has a known orientation relative to that vehicle, there may be more than one external camera per vehicle. This allows the system to determine a position and heading for each image in the video stream.

At the base level the system records raw GPS streams and video streams. Within each stream samples are ordered by time, although the time-bases may be different. Video data may be stored in MJPEG (motion JPEG) movie files. Alternatively, a customised data-base representation may be used in which the images are stored with time-stamp information. In the latter case (data-base representation), the time-stamp is stored for each frame, allowing that the frames might not be sampled with constant periodicity. In the former case (movie file) the frame rate is generally constant and the time-stamp is computed from the movie frame-time relative to a recorded start time. The main requirements are that (1) the time can be determined for each frame, and (2) it is preferred to store the original frame rather than an interpolated version of the image. In this application it may be important not to use motion-based coding. Motion coding tends to reduce the spatial resolution; more importantly, interpolated video is inadmissible as evidence in many legal jurisdictions.

A track is an association between a video stream and a GPS trajectory. GPS positions for vehicles are recorded every second. Video normally is sampled at a higher frame rate; such as five frames per second. Therefore, it is necessary to interpolate between GPS position fixes in order to obtain accurate image positions. Currently, linear interpolation is used. Within a track, data is indexed by time; the track association includes calibration between video and GPS time-bases.

System Architecture

Figure 2:
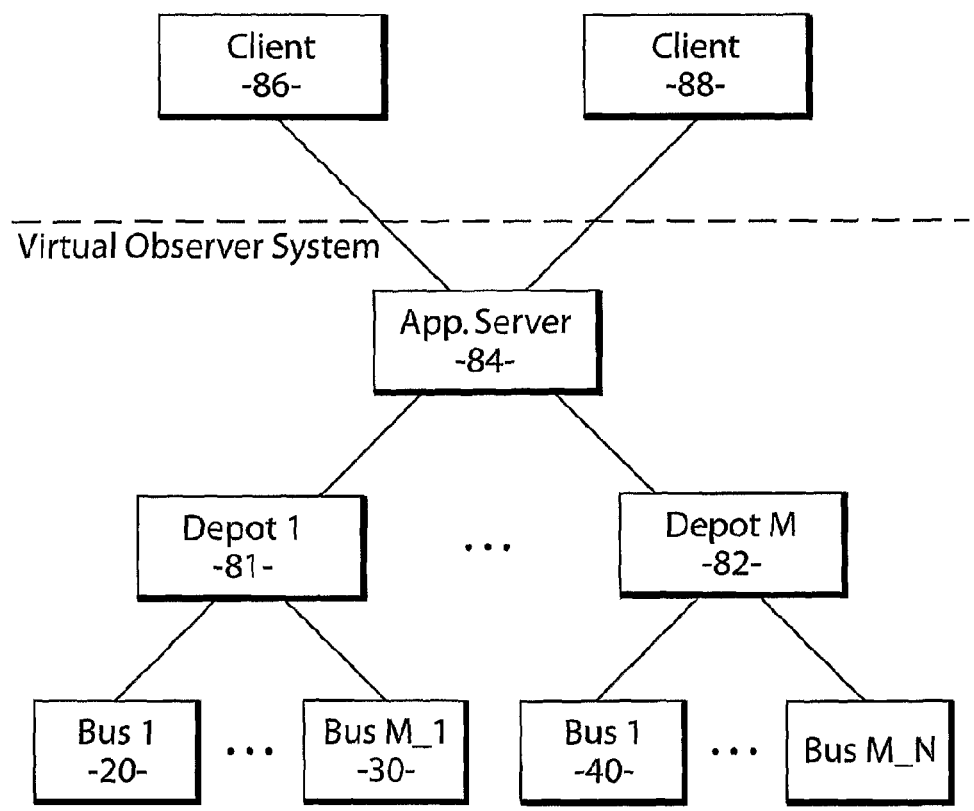
FIG. 2 is a schematic view of a virtual observer system.

FIG. 2 shows an overview of the system. At the bottom level in the diagram are the sensors or S-nodes, that is buses 20 and 30 fitted with mobile data recorders. Each bus is serviced by a D-node or depot 81 and 82, where data is offloaded via a wireless link. The D-nodes or depots are in turn connected to an application server 84 which services requests from clients 86 and 88. The application server 84 or A-node contains a large store of video and trajectory data for use in browsing and visualisation.

Connections between depots 81 and 82 and buses 20, 30 and 40 may be permanent (for example, in static camera surveillance using analog video, or video-over-fibre) or scheduled (for example, in mobile surveillance). In the latter case, communication can only occur when a sensor node (bus) is in proximity to a wireless access point at the depot. The communication capacity of the link between depots 81 and 82 and application server 84 may vary according to, for example, geographical properties such as distance.

Queries in the system originate from the application server and are propagated to the depots. The queries run at the depot whenever buses return at the end of the day, and the combined requirements over all connected buses provide a prioritised schedule of what video needs to be retrieved and stored. High-rate video segments are relatively short and are easily serviced by the system. The remaining bandwidth is dedicated to retrieving coverage data for browsing. This is less critical and the associated sampling rates can be adjusted to fit the available network capacity.

When a vehicle returns to its depot, its GPS trajectory is retrieved. Usually this will involve at most 24 hours of data (82800 points, at 1 sample per second) which can be transferred in just a few seconds. The system then computes the requirements for all standing queries.

Virtual Observer

Figure 3:
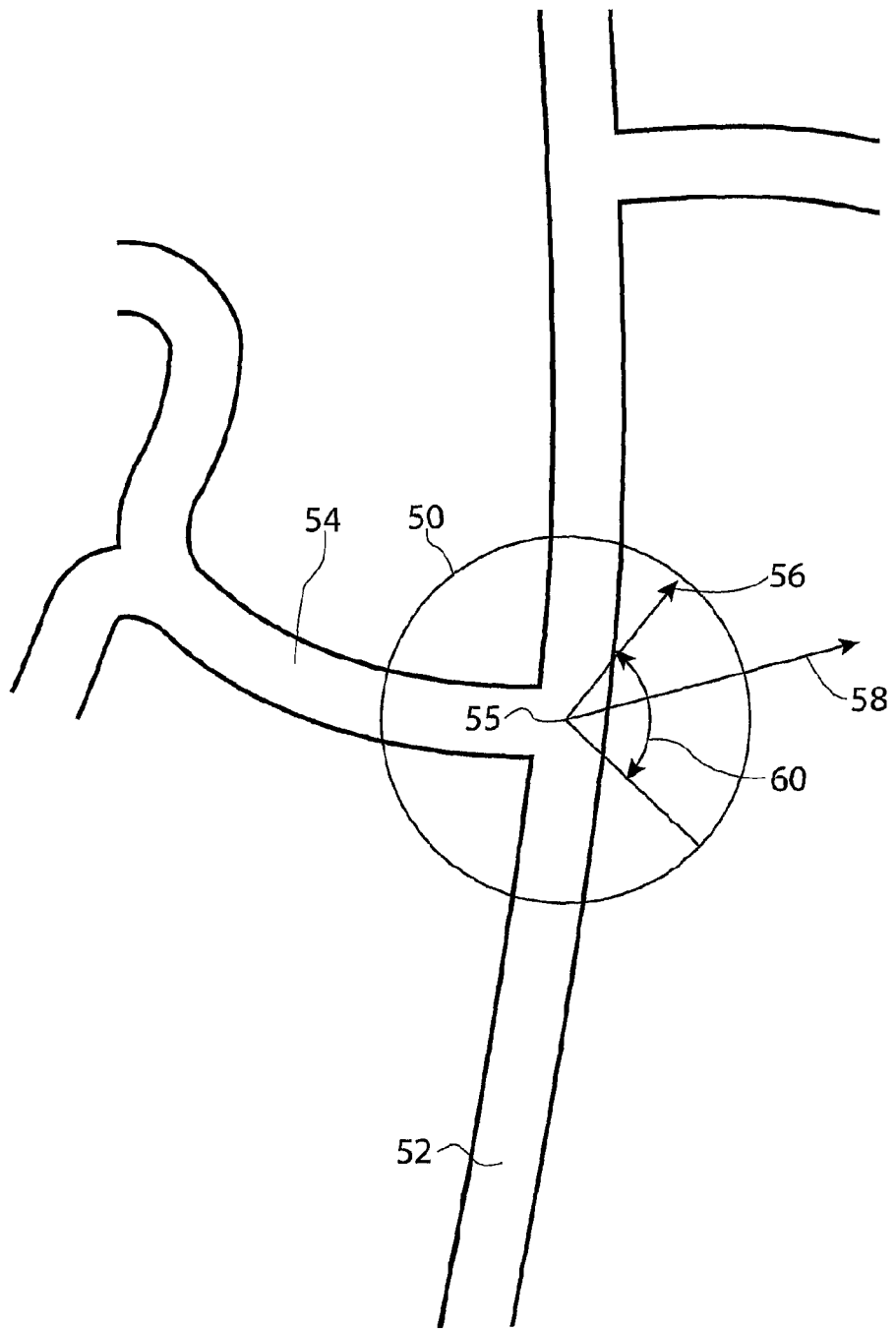
FIG. 3 is a schematic representation of a virtual observer located on a map.

A virtual observer represents an imaginary camera that is placed at a selected location in the network. FIG. 3 shows a view of part of the map of FIG. 1. A virtual observer 50 has been placed on this map and is associated with a position at the junction between a main road 52 and a side road 54. A virtual observer 50 has a central position 55, a radius 56, an orientation 58 and field of view 60.

Figure 4:
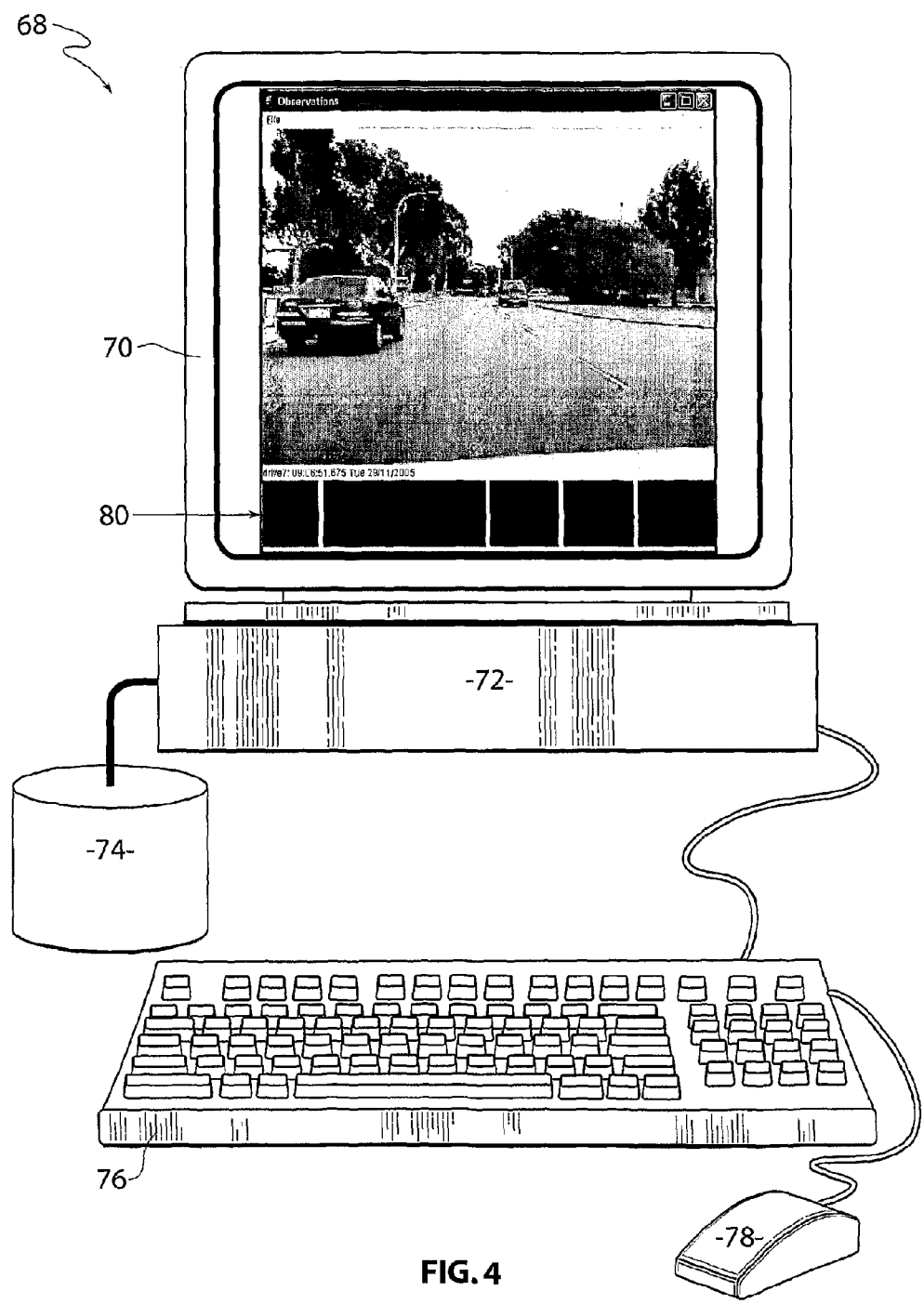
FIG. 4 is a virtual observer showing an image associated with a pseudo time-line.

The virtual observer is created and manipulated using a computer system 68, and this is shown in FIG. 4 to comprise a monitor 70, a computer 72, an image storage facility 74, a keyboard 76 and a mouse 78. The image storage facility must store the images in a fashion that supports retrieval queries based on both temporal and spatial constraints.

The virtual observer navigates available data based on map displays. These are layered spatial displays that show trajectories for one or more tracks, marker objects (including virtual observers) placed on the map by the operator, and geographic meta-data. Spatial meta-data can be imported from geographic information systems. The system supports the use of ECW (Enhanced Compressed Wavelet) imagery as display layers. This can be used to show street maps, or aerial images associated with a spatial region.

Pseudo Time-Lines

A camera track is an association between a camera and a GPS trajectory; a camera track segment is the portion of a camera track bounded by a start time and end time.

Virtual observers act as filters that select sets of camera track segments. It is important to be able to display and navigate the associated video data. Here, we use the metaphor of the media player. A frame displays the image at the current time. A time-line shows the current time as a proportion of the total available time and allows the user to change the playback point using the mouse.

However, showing the times on a linear time-line would not be very useful, since the durations of the track segments are short compared to the times between the segments. Instead, the system displays a pseudo time-line with just the duration of the segments, ordered according to their start time. This clearly shows that the segments of video are discontinuous, but allows them to be navigated as a continuous sequence.

FIG. 4 shows an example pseudo time-line 80 for the virtual observer in FIG. 3. In this instance, there are five video segments in the database that match the constraints. The relative durations are indicated by the different segment lengths. In the longer segment (for which the image is shown) the vehicle had to stop to wait for an oncoming car.

A unique point in space is associated with any time selected from a camera track segment. The system implements a space-time cursor which allows the user to see correspondence between points in the spatial map display and the time-line display. When selecting points in the time-line, the system highlights the corresponding location in the map. Additionally, the user can select points on tracks in the spatial display and see the corresponding images.

Navigation and Queries

The virtual observer markers may be named and used for navigation in the map display. The placement of the marker defines an area of space for which video is to be retrieved. The user defines the central position, radius, orientation and field-of-view. These observation parameters can be controlled by the user manipulating visual markers; for instance, these parameters may be varied by dragging points in the image, for instance, the circle boundary to change the radius, the circle interior to move the area, the arrow-head to rotate the view direction and the arc boundaries to change the field of view. In this way the computer system provides natural metaphors that the user can use to specify their wishes.

A virtual observer may be selected using the mouse or by selecting its name from a list. When selected, a user may make queries of the virtual observer. A "virtual observer" query allows the user to visualise the scene at a selected place over time. The system provides spatial query operators which return small segments of video that match the query constraints. These queries are typically defined in a visual query environment.

The system provides the user with spatio-temporal context for placement of queries and to see what kind of views are likely to result. Initially, this may involve using a "tracking" query, which shows the closest observation to the mouse allowing the user to "scrub" the map to find places of interest. Typically there will be a level of background "coverage" data that is dense in space (position and orientation), but may be sparse in time. In contrast, a query is usually sparse in space, but dense in time. So, effectively implementing the system requires a mixture of operators that select data using different sampling criteria:

Observation operators: high level of detail over a small spatial area.

Coverage operators: low level of detail over a large spatial area.

At the lowest level, spatial queries are implemented using geometric operators on tracks. Users define points or regions of interest through the visualisation system; the system interactively produces views of those regions based on these queries. Results from these queries are returned as times, or intervals of times. Given a track and a time, it is easy to determine the associated spatial location, and the associated frame of video.

Let V be a vehicle, let cameras(V) be the set of its cameras, and trajectory(V) be its trajectory. The trajectory is a function that maps any point in time to a point in space using linear interpolation on the recorded GPS track. The location of the vehicle at any point t in time is therefore trajectory(V)(t), or simply trajectory(V,t) for short.

Each camera C is has an orientation orient(C) relative to the heading of its vehicle vehicle(C)=V. We define an observation to be a tuple $\langle I, t \rangle$, where I is an observed image, and t is the time at which the observation occurred. Each camera C also defines a video sequence vid(C) which is a sequence $[\langle I_0, t_0 \rangle, \ldots, \langle I_{N-1}, t_{N-1} \rangle]$ of N observations. We can treat vid(C) as a function that maps a time to an observation. Define vid(C,t) to return the observation ⟨ I,t' ⟩ such that t' is closest to t over all observations.

A camera track observation is a tuple ⟨ C,t ⟩ where C is a camera, and t is a time. A camera track segment is a tuple ⟨ C,$t_1$,$t_2$,A ⟩,, where $t_1$ and $t_2$ are times, $t_1 \leq t_2$ and A is a sampling rate. Camera track observations and camera track segments are returned by geometric queries. Associated with each camera track observation is a unique observation (a time-stamped image) vid(C,t). Associated with each camera track segment is an observation sequence (a time-stamped video segment):

$$[vid(C,t_1), \ldots, vid(C,t_2)].$$

A simple visibility constraint is a tuple O=⟨ P,R,D,F ⟩,, where P is a point in space, R is a visibility radius, D is a view direction, and F is a field of view. A simple visibility constraint defines an acceptance area and view range. The area is a circle of radius R centred at P. The view range is the range of directions between D−F and D+F. Visibility constraints are used by view operators to select observations based on visibility.

In general, a query Q is a tuple:

$$\langle op, O, A \rangle$$

where op is an operator, O is set of corresponding constraints, and A is a sampling rate. Each operator defines a mapping between a camera C and a set of camera track segments. For observer queries op is a visibility operator, and O is a visibility constraint.

There are three types of queries or operators:
Point-based queries such as proxobs, which map a point in space to a camera track observation using recorded vehicle trajectories.
Visibility or observation queries such as viewIn and viewOut, which reconstruct the view of small spatial area or a particular point in space with high level of detail. And,
Coverage queries such as cover, which reconstruct the view of a large spatial area with low level of detail.

Point-based and observation queries are of high value to the system, but may only require a small part of the network bandwidth. Coverage queries use the remaining bandwidth in a targeted way to provide background data for browsing.

The proxobs operator is computed by finding closest point on each trajectory to P, and choosing the trajectory that minimises this distance.

Definition 1 (op=proxobs: Closest observation): Let P be a point in space. Let C' be a set of cameras. We define the function proxobs(P, C') to return the camera track observation ⟨ C,t ⟩,, C∈C', such that the distance from trajectory(V,t), V=vehicle(C), to P is minimised over all times and cameras.

Figure 5:
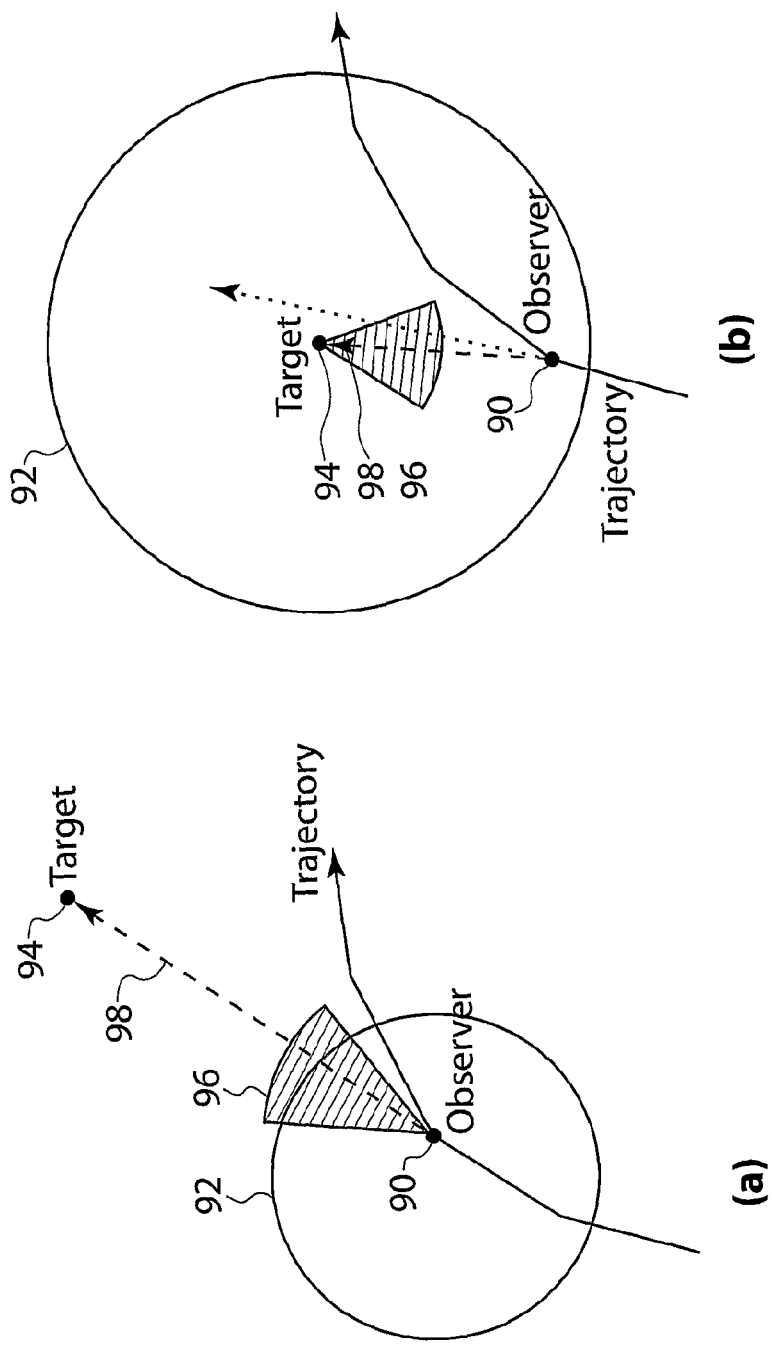
FIGS. 5 (a) and (b) show the viewIn and viewOut query operators, respectively.

Visibility queries are more complex, being based on a set of spatial constraints. We use visibility constraints to reconstruct the view at a particular point in space. The two fundamental visibility operators are viewOut and viewIn. Both operators use simple visibility constraints, but interpret the constraints differently; as shown in FIGS. 5(a) and (b). In both cases, the observer 90 is located inside the view area 92. For the viewOut operator in FIG. 5(a), the view target 94 is generally outside the defined area 92, although its location is unknown to the system. The angular constraint 96 is on the direction 98 from the observer toward the target. For the viewIn operator in FIG. 5(b), the view target 94 is the centre of the defined area 92, and the constraint 96 is on the direction 98 from the target to the observer.

Definition 2 (op=viewOut: View from a place): We define the function viewOut(C,O,A) to be the set of camera track segments ⟨ C,$t_1$,$t_2$,A ⟩ where V=vehicle(C), O is a simple visibility constraint ⟨ P,R,D,F ⟩,, and trajectory(V,t) is entirely contained within the circle of radius R centred at P, and the heading at trajectory(V,t) is between D−orient(C)−F and D−orient(C)+F for $t_1 \leq t \leq t_2$.

Definition 3 (op=viewIn: View towards a place): We define the function viewIn(C,O,A,f) to be the set of camera track segments ⟨ C,$t_1$,$t_2$,A ⟩ where V=vehicle(C), O is a simple visibility constraint ⟨ P,R,D,F ⟩,, and trajectory(V,t) is entirely contained within the circle of radius R centred at P, and the heading of the line between P and trajectory(V,t) is between D−orient(C)−F and D−orient(C)+F, and is within the camera field-of-view f of the trajectory heading at t for $t_1 \leq t \leq t_2$.

For coverage queries, op is simply the spatial containment operator, and O is a spatial region, generally described by a polygonal boundary.

Definition 4 (op=cover: Coverage constraint) We define the function cover(C,O,A) to be the set of camera track segments ⟨ C,$t_1$,$t_2$, A ⟩ where V=vehicle(C), O is a spatial region, and trajectory(V,t) is entirely contained within O for $t_1 \leq t \leq t_2$.

Figure 6:
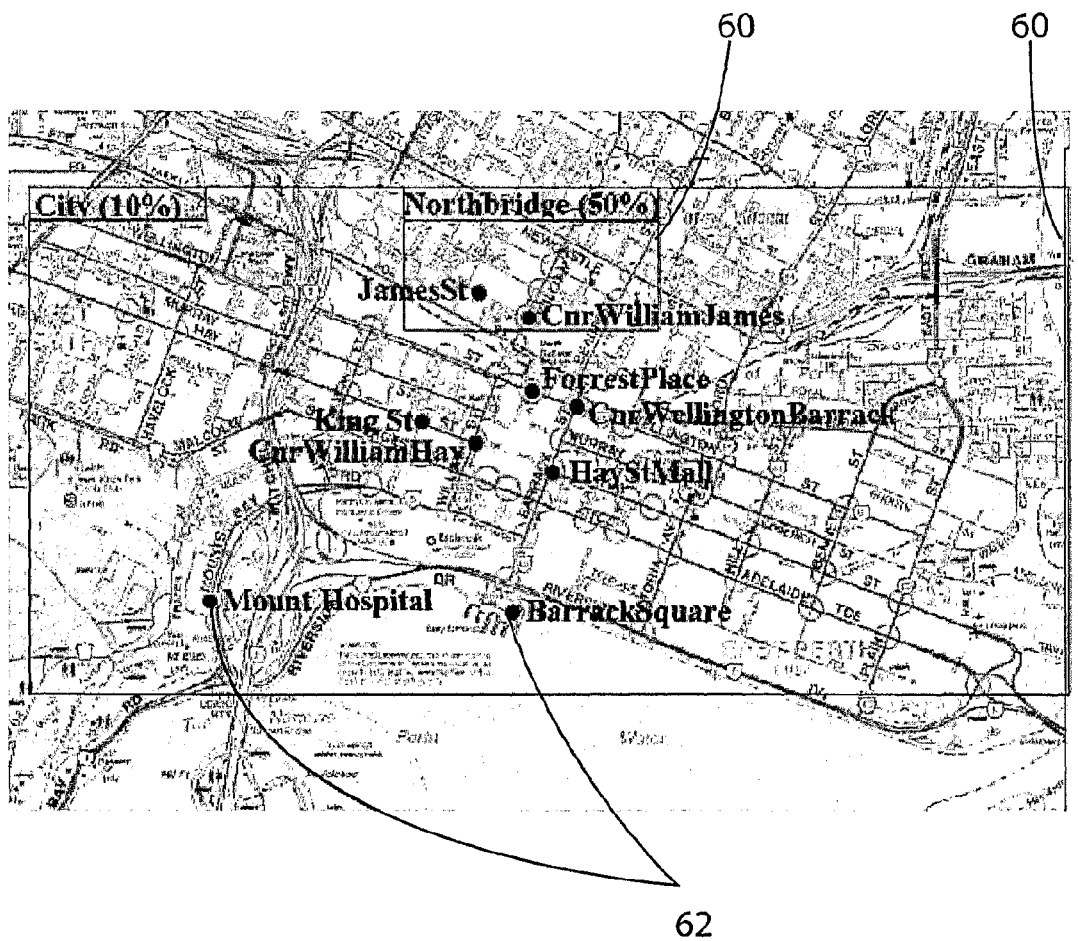
FIG. 6 shows a typical set of coverage and observation queries.
Figure 7:
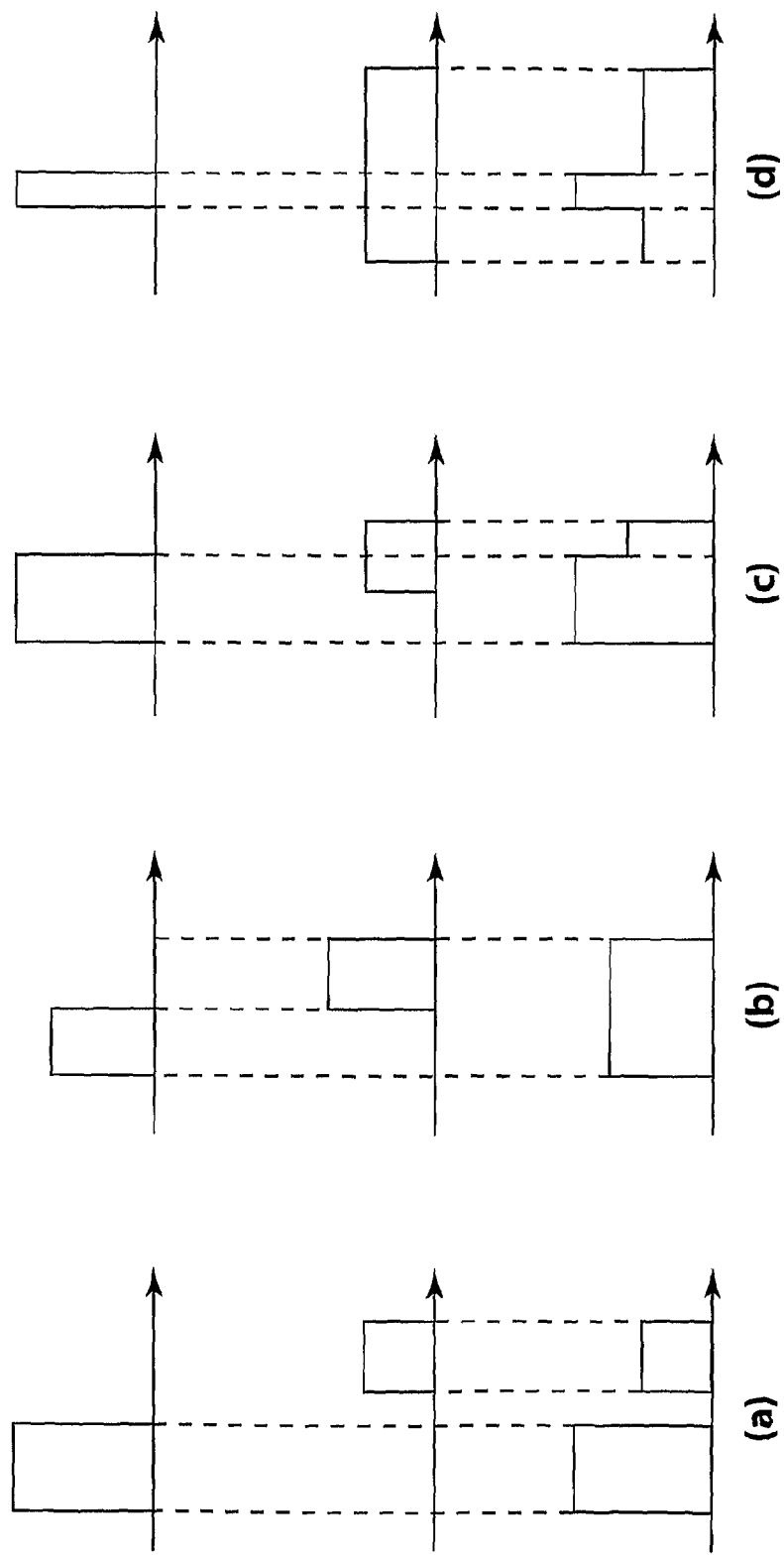
FIGS. 7(a), (b), (c) and (d) show example cases for merge operation.

For example, FIG. 6 shows a typical set of queries within the system. The "circular" queries 62 (for example, "Barrack-Square" and "Mount Hospital") are virtual observers with radii of about 50 m. In these positions we require a high level of detail; in practice we want all of the available data at the highest frame rate. The "region" queries 60 (for example, City and Northbridge) are coverage queries that specify the requirements of the system for background data. Sampling rates are shown as a percentage of the full frame rate of 5 fps. For Northbridge, a popular entertainment area, we require higher level of background coverage: 50% versus 10% for the City area.

The view operators can be rapidly computed from available trajectory information without reference to the associated video data. The operators produce a set of camera track segments that can be used in various ways by the system as described in the following sections. Virtual observers use view operators to create views of places; these can be defined interactively through the visualisation system. Sets of track segments can be used to construct "pseudo time-lines" for navigation of video data. Camera track segments can also be used as observations for panorama generation.

Query Resolution

An important feature of query processing is the evolution of query result over time. In general, results must be retrieved from the network and therefore cannot be provided instantaneously. However, it is usually possible to predict how much data will available within the network to satisfy the query.

Query resolution determines the segments of mobile-camera video that correspond to each query in the system. This involves mapping spatial queries and trajectory data to temporal video-segment description. In the event of a new observation query resolution follows a sequence like this:

1. Some data may already be available online, for instance if the query overlaps with existing coverage data or another observation query.

2. GPS tracks for previous days will be resident in the system, so it is possible to calculate how much data is available to be retrieved from the buses to the depot.

3. When the sensors come on-line this data can be retrieved to the depots. If for some reason the connection is delayed some of the expected data may be lost.

4. Over time these results are moved to the application server to be returned to the client. The rate at which this happens depends on the speed of the links to the depots The sequence will now be explained in detail. Once the trajectory trajectory(V) of a vehicle is known, it is possible to resolve the video requirements for each of the attached cameras. For each query Q=⟨op,O,A⟩ and each camera C∈cameras(V) the system evaluates op(C,O,A). The result is a sequence of camera track segments for each combination C×Q of camera and query. By appropriately factoring the internal state of each operator this computation is done using a single pass through the trajectory data.

The system then merges the output for multiple queries to give a single sequence of camera track segments for each camera. This is done in a way that retains the maximum required sampling rate in the event of any overlaps. Consider a set of track segments $O_i = \langle C_i, s_{i,1}, t_{i,1}, R_{i,1} \rangle, \ldots, \langle C_i, s_{i,N_i}, t_{i,N_i}, R_{i,N_i} \rangle$. Each set $O_i$ is symmetric with a function $F_i(x)$ defined piece-wise as follows:

$$F_i(x) = \begin{cases} R_{i,j} & \text{if } s_{i,j} < x <= t_{i,j} \\ \text{undefined} & \text{otherwise} \end{cases}$$

For a set of N functions, we can form the function:

$$M(x) = \max_{i=1}^{N} F_i(x)$$

which for any value of x is the maximal value over all $F_i$. This is also defined piece-wise, but we desire the minimal piece-wise representation of this function. Specifically, if two segments ⟨C,x,y,R⟩ and ⟨C,x,z,R⟩ are adjacent and have equal values, they are replaced by the segment ⟨C,x,y,R⟩..

Some cases are shown in FIG. 7(a) to (d). In case (a), two disjoint segments merge as disjoint. Where adjacent segments have equal value (b), the result is one merged segment. Cases (c) and (d) show some examples resulting from overlapping inputs; the first results in two segments, the second results in three segments. Always, the result is the maximal sample rate over all input segments.

If $O = \{O_1, \ldots, O_N\}$ is a set of N track segment sets, we define the function merge(O) to be the set of track segments forming the minimal piece-wise representation of M(x), the maximum over all of the corresponding functions. Where O contains segments from different cameras, the cameras are merged independently.

Figure 8:
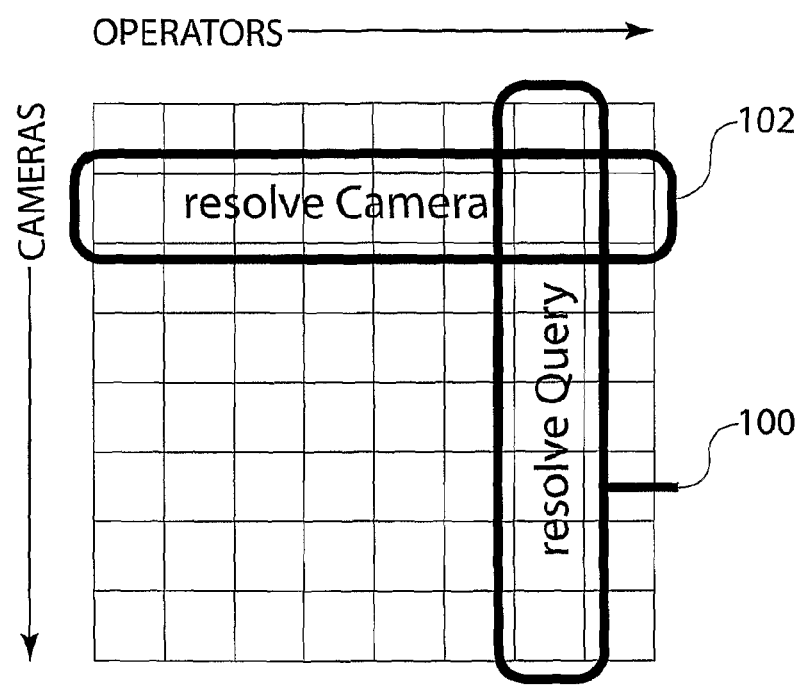
FIG. 8 shows the different merges of camera-operators outputs for query resolution.

The resolveCamera and resolveQuery functions are used in different parts of the system. FIG. 8 shows a combination of camera and query C×Q elements in a matrix of camera track segment results which are merged in different ways. For visualisation, resolveQuery 100 is performed at A-Nodes to merge multiple cameras to derive the output of individual queries. For data gathering, resolveCamera 102 is generally run at D-nodes or S-nodes to merge multiple queries to derive the output of individual camera. This approach allows the system to minimise the amount of data to be retrieved from each vehicle, but to do this in a flexible, decentralised way that depends on specific user queries (observation queries) as well as general rules to anticipate demand (coverage queries).

Definition 5 (resolveCamera: One camera, Multiple operators) Given a set Q of queries we compute:

resolveCamera(Q,c)=merge({op(c,O,A)|
⟨op,O,A⟩ ∈Q}), which for any camera c is the result of merging the output of all queries in Q for that camera. This defines the time and sampling rate requirements for the video data that must be retrieved for camera C.

Figure 9:
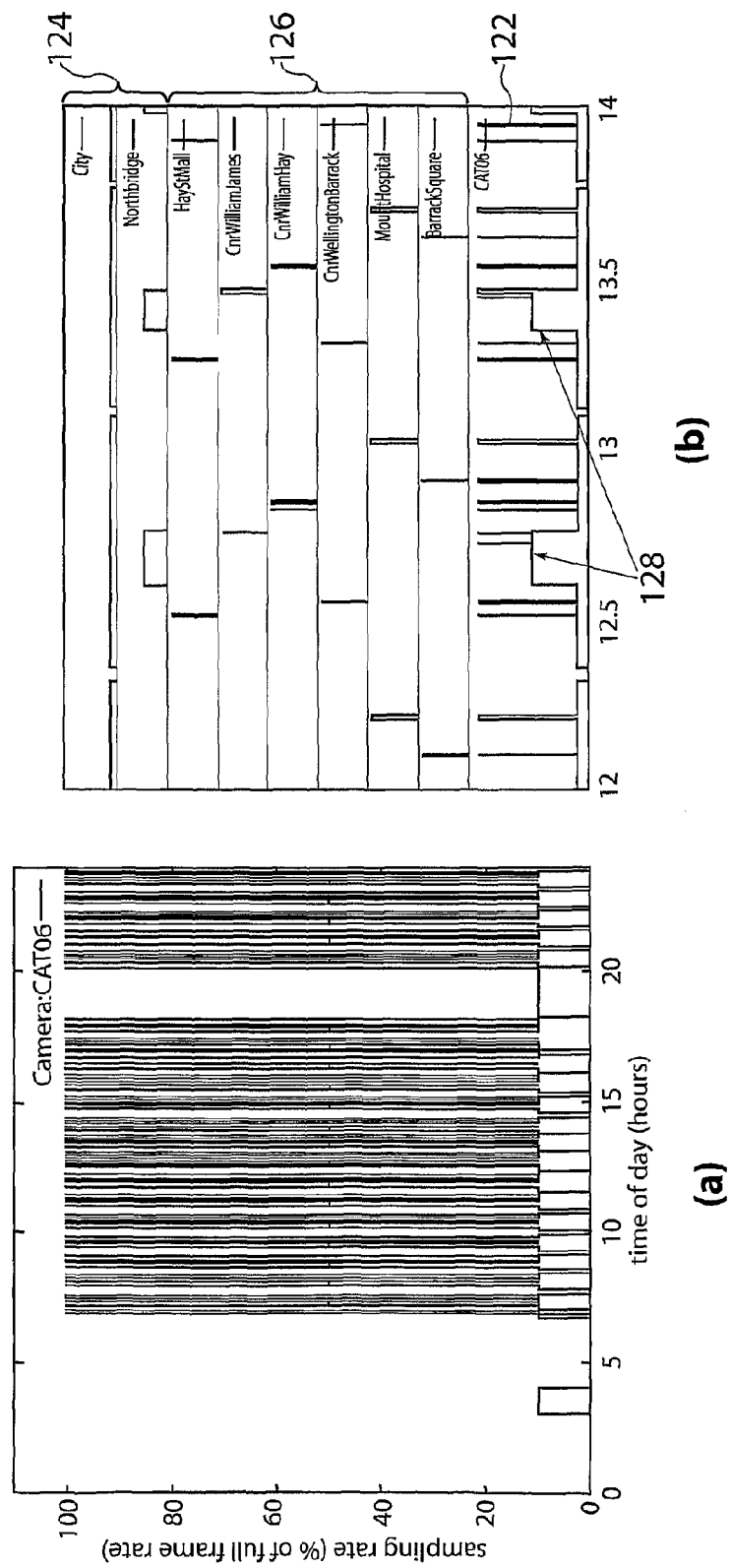
FIG. 9(a) shows the video requirements of one camera throughout a day.
FIG. 9(b) shows detailed video requirements of eight queries over a two hour period.

The result of this query resolution process that corresponds to the query operations in FIG. 6 is shown in FIGS. 9(a) and 9(b). A bus, labelled as CAT06 in FIG. 9(a), traverses a circuit twenty one times over the period of a day. Each time it passes through a virtual observer a short segment of high-resolution video is captured. The horizontal axis shows the time of day. The vertical axis shows the requested video sampling rate as a percentage of the full frame rate. The background rate is defined by coverage queries: the City query is 10%, and the Northbridge query is 50%.

FIG. 9(a) shows sampling rate over a 24 hour period. FIG. 9(b) shows detail over a two hour period, and indicates how resolveCamera computes the resultant signal 122 by merging the set of outputs for specific coverage 124 and observation 126 queries. These queries correspond to 60 and 62 in FIG. 6, respectively. The observer queries 126 are generally disjoint in time, being based on non-overlapping target regions. The coverage queries 124 overlap the observer queries as well as other coverage queries. Each time the bus passes through a virtual observer a short segment of high-resolution video is required, resulting in a "spike" in the graph. The "step" patterns 128 around 12:30 and 13:30 correspond to a transition between coverage operators where the background rate changes between 10% (City) and 50% (Northbridge).

Definition 6 (resolveQuery: Multiple cameras, One operator) We define:

resolveQuery(C,q)=merge({op(c,O,A)|
⟨op,O,A⟩ =q^c∈C})

which for any query q is the result of merging the output of all cameras in C for that query. For any observation query, this defines that set of camera track segments that match the query.

Figure 10:
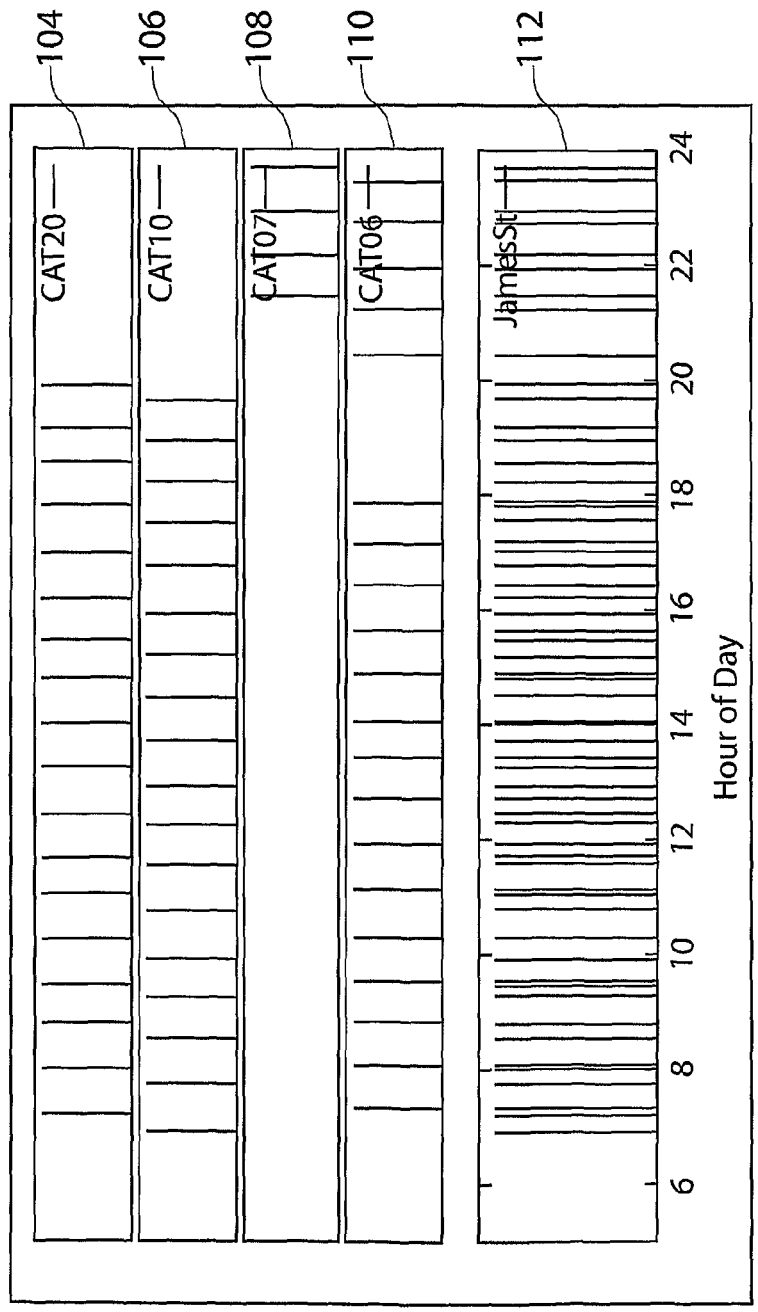
FIG. 10 shows the output of one observation operator.

FIGS. 10 and 11(a) to (g) illustrate the process of resolveQuery that corresponds to an observation query in FIG. 6. FIG. 10 depicts how four different vehicle cameras (104, 106, 108 and 110) contribute observations of a place over the course of a day. The horizontal axis shows time of day, and the vertical axis shows sampling rate. Each "spike" in the plot corresponds to a camera track segment of high sampling rate. The bottom trace 112 ("James St") shows the operator output which is a combination of the outputs of the individual cameras.

Figure 11:
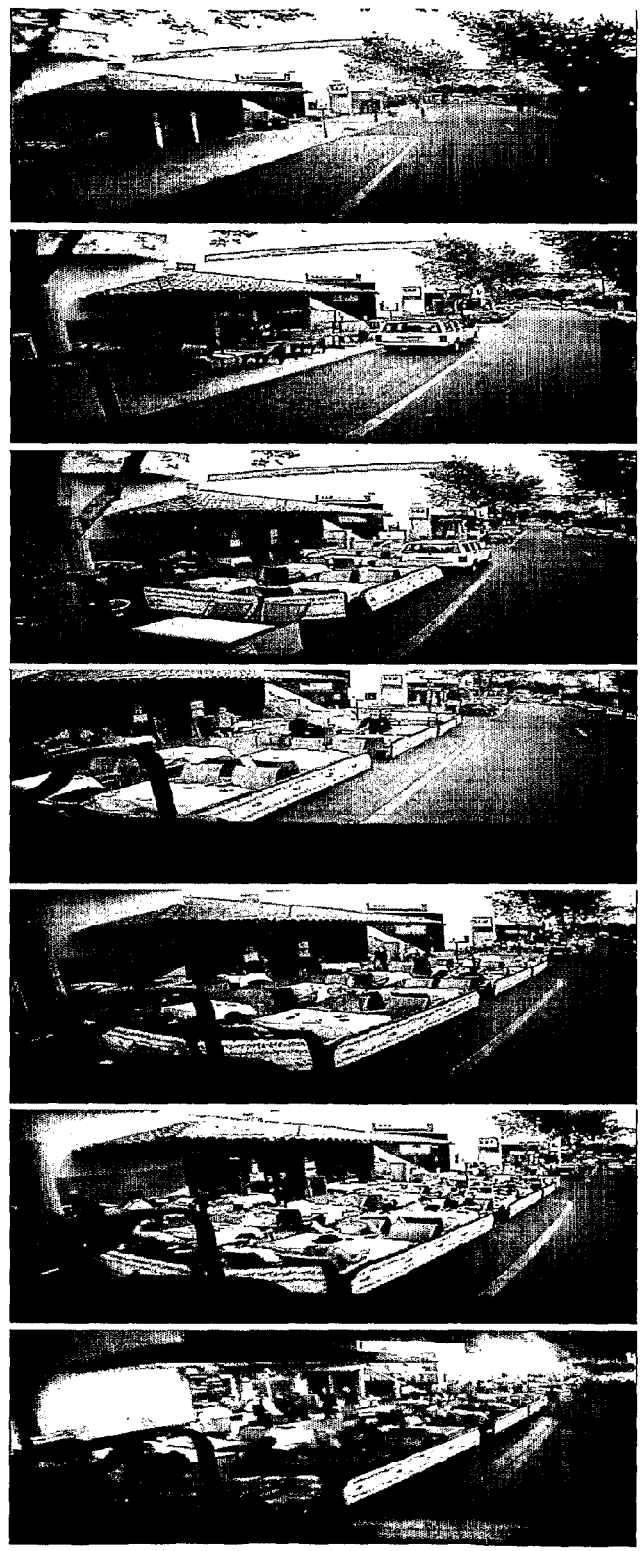
FIG. 11 is a time-lapse view of a day in the life of a restaurant.

FIGS. 11(a) to (g) show the materialised output of this query at different times of the day. The images depict a time-lapse view showing a day in the life of a restaurant and the changes in the restaurant's appearance between morning and evening. In the early morning, the streets are deserted; FIG. 11(a). Later in FIG. 11(b), tables are stacked, waiting to be laid out for alfresco dining. Initially, part of the dining area is blocked by a parked car; FIG. 11(c). Later, the seating is ready, and waiters are setting the tables FIG. 11(d). Patrons begin to arrive (FIG. 11(e)), and stay late into the evening; FIGS. 11(f) to (g).

Distributed Processing

As mentioned previously, there may only be sufficient network bandwidth between D-nodes (depots) and S-nodes (vehicles) to retrieve about 10% of the generated video. The system aims to make best use of available bandwidth to return requested video to the client. This section shows how query resolution is performed in a distributed network and how the resulting video is made available to the client.

Formally, we model the network as a graph. Let N=A∪D∪S be the set of all A-nodes (application servers), D-nodes (depots) and S-nodes (vehicles), where A, D, and S are the sets of A-nodes, D-nodes and S-nodes respectively. Associated with each node n∈N is a set of resident video corresponding to camera track segments res(n) and a set traj(n) of vehicle trajectories. A connection e∈E between nodes a and b is represented as a tuple ⟨a,b,f⟩, where f(t) is a connectivity function that express the connection bandwidth as a function of time.

Queries in the system originate from A-nodes and move down the tree. Trajectory data moves up the tree, at low cost because the volume is relatively small (for example, 1 Mb per vehicle per day). Video data moves up the tree, but the amount of data that can be moved is constrained by the bandwidth between nodes.

Depending on the state of the system, there are several possible relationships between a camera C and a query q. We say that q is resolvable with respect to C at node n if the required trajectory data is available at node n:

trajectory(vehicle(C))∈traj(n).

We say that q is materialised with respect to C if q is resolvable and the result is resident at node n:

resolveQuery(C,q) ⊂ res(n).

The main possibilities are therefore:
(1) A query unresolvable at n if the trajectory data has not moved up the tree to node n.
(2) A query is resolvable but unmaterialised if the trajectory data is available, but the video data is not available.
(3) A query is materialised if both trajectory and video data is available. A query may be partially materialised if some video data is available but some is not available. This may occur if some coverage data exists but at a lower than required sampling rate, or if data is available at the correct rate, but for only part of the time range of a query.

Query resolution (resolveQuery, resolveCamera) can occur at any level of the tree at which the required trajectory data exists. For interactive queries (using resolveQuery) such as tracking, browsing, and placement of new observers we usually require that the queries be resolved over all cameras and that the results be rapidly materialised, so these queries execute at the top of the tree and return small amounts of data, either directly from A-node (server) storage, or by pulling data from storage at the relevant D-node (depot).

For non-interactive data-gathering queries such as permanent virtual observers and coverage queries, resolution uses resolveCamera at the lower levels, either at S-nodes (vehicles), or at D-nodes (depots). These queries generally need to be resolved but do not need to be rapidly materialised, and are processed with respect to the cameras on a particular vehicle when new trajectory data becomes available. Their role is to pull data from sensors or vehicles into the network.

Query materialisation can occur at differing degrees at different levels of the tree. Most of the video data exists at the bottom of the tree (ie. at D-nodes). Due to bandwidth constraints on the A-D-node links, only a portion of the available data will be resident at A-nodes. Queries are generally propagated down the tree from A-nodes until they can be serviced.

While the model allows that queries be executed at S-nodes (servers), the current implementation is constrained by the type of processing that can be done on the commercially-available mobile data recorders. In practice, data-gathering queries are resolved at D-nodes whenever buses return to their depot at the end of the day. Once the GPS data has been downloaded, the queries are resolved and the required camera track segments are requested through the vendor's existing fleet-management API. The combined requirements over all vehicles can be analysed to provide a prioritised schedule of what video needs to be retrieved and stored. High-rate video segments (from observer queries) are relatively short in duration and are easily serviced by the system. The remaining bandwidth is dedicated to retrieving coverage data for browsing. This is less critical and the associated sampling rates can be adjusted to fit the available network capacity.

View Synthesis

The computer system can be operated to reconstruct a virtual observer's view for display on the monitor, from the appropriate raw image frames collected by the on-vehicle cameras and stored in the image store 74. The virtual observer 68 combines the frames together in particular ways depending on the type of view that is desired by the user.

A number of different views are available to the virtual observer 68, based on the constraints of space, time and geometry, or the visibility of landmarks. For instance, the virtual observer can synthesize wide-angle panoramic views in situations where camera motion has produced suitable sampling of the scene. This requires the virtual observer to address a number of issues not found in conventional static-camera surveillance systems.

The virtual observer constructs its view by indexing, organising and transforming images collected from the mobile camera network. Where necessary, the system will build composite images by combining observations taken at different times.

In more detail, view synthesis involves both the retrieval and fusion of images for a given query. Many query operations need to determine views with respect to a particular place. This poses several challenges in the context of mobile surveillance. Due to the ad-hoc way in which data is collected, there is high variability between the images that are available for a particular place and time. The scenes are sampled infrequently compared to static-camera surveillance. For example, along a bus route a place is only imaged when a bus is in the vicinity. Therefore, the sampling times depend on the frequency of buses on that route. Images of a place are taken by different camera mounted on different vehicles. There may be significant differences due to sensor response, lighting and perspective.

For simple image retrieval tasks, differences between images do not pose a significant problem. However, for panorama generation it is necessary to select a sequence of relevant images, and then register those images with respect to a common reference frame.

For image selection, it is possible to use constraints on position, heading and rate-of-change of heading to identify candidate image sequences. For image registration and blending, the orientation derived from GPS data may not be sufficiently precise, and more sophisticated techniques may need to be used.

In addition to the virtual observer facilities, map displays implement a "tracking" mode in which the user can move a cursor in the display to select the closest matching observation. Given a point P, the system uses proxobs(P,C') to find and display the associated images vid(C,t). Depending on cursor modifiers, C' is either the set of all tracks, or a particular selected track. Tracking can be used to generate a kind of "virtual drive" effect, where a video sequence can be generated for an arbitrary trajectory through a map.

Image Stitching

Image alignment and stitching algorithms are used to create high-resolution images out of mosaics of smaller images. The earliest applications include the production of maps from aerial photographs and satellite images. Recently, these algorithms have been used in hand-held imaging devices such as camcorders and digital cameras. Image stitching requires several steps:

First, a motion model must be determined, which relates pixel co-ordinates between images. Alignment of pairs of images is computed, using direct pixel to pixel comparison, or using feature-based techniques. Next, a globally consistent alignment (or "bundle adjustment") is computed for the overlapping images. Next, a compositing surface is chosen onto which each of the images is mapped according to its computed alignment. The mapped images are then blended to produce the final image. The blending algorithm needs to minimise visual artefacts at the joins between images and needs to care fro difference in exposure between the source images.

Image stitching applications vary in the way they handle motion, image alignment and blending. Direct alignment methods rely on cross-correlation of images and tend not to work well in the presence of rotation or foreshortening. Modern feature detectors can be quite robust in the presence of certain amounts of affine transformation. Of particular note is David Lowe's SIFT (Scale-Invariant Feature Transform). In a recent survey of a number of feature descriptors, SIFT was found to be the most robust under image rotations, scale-changes, affine transformation and illumination changes. Brown and Lowe describe an automatic panorama stitcher based on SIFT feature matching. This is one of the first implementations that can automatically recognise multiple panoramas from an input set of images. A commercial version of this algorithm, AutoStitch, is used under license in several photographic applications.

In the context of wide-area surveillance, image stitching (or "mosaicing") is important because it can be used to improve the effective resolution of a camera. Pan-tilt-zoom cameras can be used to scan a scene at different scale factors. By stitching many images collected at a high "zoom" factor, a high-resolution virtual field of view can be created. Heikkila and Pietikainen describe a system that builds image mosaics from sequences of video taken by a camera that scans a scene. The implementation is similar to, but with a few modifications to deal with large numbers of images. SIFT features are used in image alignment. Gaussian blending is used for compositing images, but also to identify small problems with image registration.

Panorama Generation

When a vehicle turns, the forward-facing camera pans across the scene. This generates a sequence of images which can be combined to form a composite, wide-angle image. When a virtual observer is placed at an intersection or turning in the road, the matching track segments define a sequence of images suitable for stitching. Alternatively, the system can identify candidate track segments by looking for regions where the rate-of-change of heading is high. 10 degrees per second has been found to give good results.

The system uses the method of Brown and Lowe to generate panoramas from a set of images. This involves several steps: Feature points are identified using the SIFT keypoint detector. Each keypoint is associated with a position, a scale and an orientation. SIFT features are robust to small amounts of affine transformation. SIFT features are calculated for each input image. The k nearest-neighbours are found for each feature. For each image the algorithm considers m images that have the greatest number of feature matches to the current image. RANSAC is used to select a set of inliers that are compatible with a homography between the images. A probabilistic model is then used to verify image matches. Bundle adjustment is then used to solve for all of the camera parameters jointly. Once the camera parameters have been estimated for each image, the images can be rendered into a common reference frame. Multi-band blending is then used to combine images.

The system uses AutoStitch to implement its panorama construction. Although designed for photographic work, this implementation works well for images taken from mobile video cameras. In experiments, it appears that most of the processing time is required during the blending phase of the algorithm. Using a simpler blending algorithm, such as linear blending instead of multi-band blending, improves processing time dramatically. In an interactive setting where response time is significant, it may make sense to progressively improve the blending quality as images are viewed for longer periods. For example, the initial image may be presented using linear blending, while a multi-band blend is started as a background process, taking maybe 20 or 30 seconds to complete with high quality settings.

Figure 12:
FIGS. 12(a), (b) and (c) are three panoramic images.
Figure 12:
Figure 12:
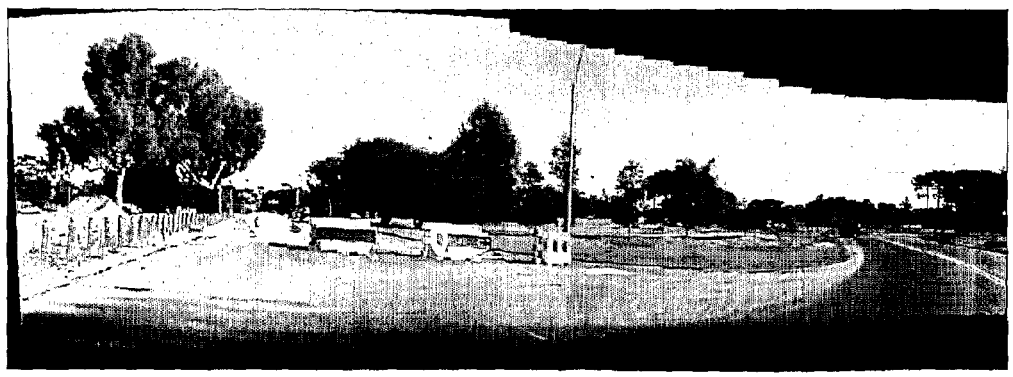

FIGS. 12 (a), (b) and (c) show several panoramic views generated automatically from the virtual observer in FIG. 3. Each panorama corresponds to a separate traversal of the intersection. The panoramas are not completely linear in size as the turn involves some forward motion as well as a rotation. This means that the later images are enlarged (i.e., "zoomed") relative to the earlier images. During bundle-adjustment these images are scaled down to fit a consistent reference frame. there are also small variations in the shape of the resulting image, due to differences in the original trajectories.

An important feature of the panoramic stitching process is that is simply relies on common features to compute image registration. The previous panoramas are generated from temporally contiguous samples, but this is not a necessary condition for the stitching to work. Providing there is sufficient overlap, temporally dis-contiguous samples can be used.

Figure 13:
FIG. 13 is a 180° synthetic panoramic image.

FIG. 13 shows an example of the kind of scene that can be generated by stitching together images taken at different times. As a vehicle turns at an intersection, the forward facing camera pans across part of the scene. The left-hand portion of the image is derived from a right-turn from the west-bound lane. The right-hand portion is derived from a left-turn form the east-bound lane. when interpreting such an image, it is important to recognise that the image is a composite constructed from observations at different times. While the large-scale structure will probably be correct, it may be misleading to make assumptions about objects moving in the scene.

The current implementation (based on AutoStitch) assumes that the camera sweeps across the scene by rotating around a common optical centre. It seems to also work well in situations where some forward motion occurs during the rotation (i.e., a forward-facing view from a turning vehicle). Another possible model for sweeping a scene would be to have a camera facing perpendicular to the direction of motion (i.e., a side-facing view from a vehicle). This latter model has the advantage that almost any motion of the vehicle would scan the scene, whereas the former model requires a turning motion. It is expected that the approach of Brown and Lowe would also work for side-facing cameras, although some variation of the formulation of the camera homographies would improve the camera modelling. Indeed, this approach (moving perpendicular to the view axis) is used in most aerial photography applications.

Implementation

The system has been implemented as a prototype application written in Java, and consists of several parts: a storage manager, a query processor, and visual environment. The storage manager implements specialised storage schemes for image and trajectory data. A trajectory is stored in a single file as a stream of binary records ordered by time. This allows all or part of the trajectory to be processed by sequentially reading a section of the file. Video is stored in a container file as "blobs" of raw JPEG images. A region of the container file is an index with the time-stamp, position and size of each blob. Both trajectory and image containers are temporally sorted and accessed using either time (by binary-search of the file or index) or ordinal position.

The query processor implements operators such as proxobs, viewIn, viewOut and cover. The outputs from multiple queries are merged to produce compact camera track segment lists. These are used in two ways. Firstly camera track segments are used to build pseudo time-lines for navigating the video data in response to interactive queries. Secondly camera track segments define segments of video that are to be imported into the system for standing queries.

Java Swing components are used for user interface and visualisation. Media I/O is done using either core Java classes, or QuickTime APIs. Third-party components are used to render ECW images. There are several main parts to the implementation. A low-level stream-based storage management system handles video and GPS data, which are stored on disk and indexed by time. At a higher level a track management system relates video streams, camera parameters and trajectories. This permits retrieval based on spatial constraints such as proximity and visibility.

Figure 14:
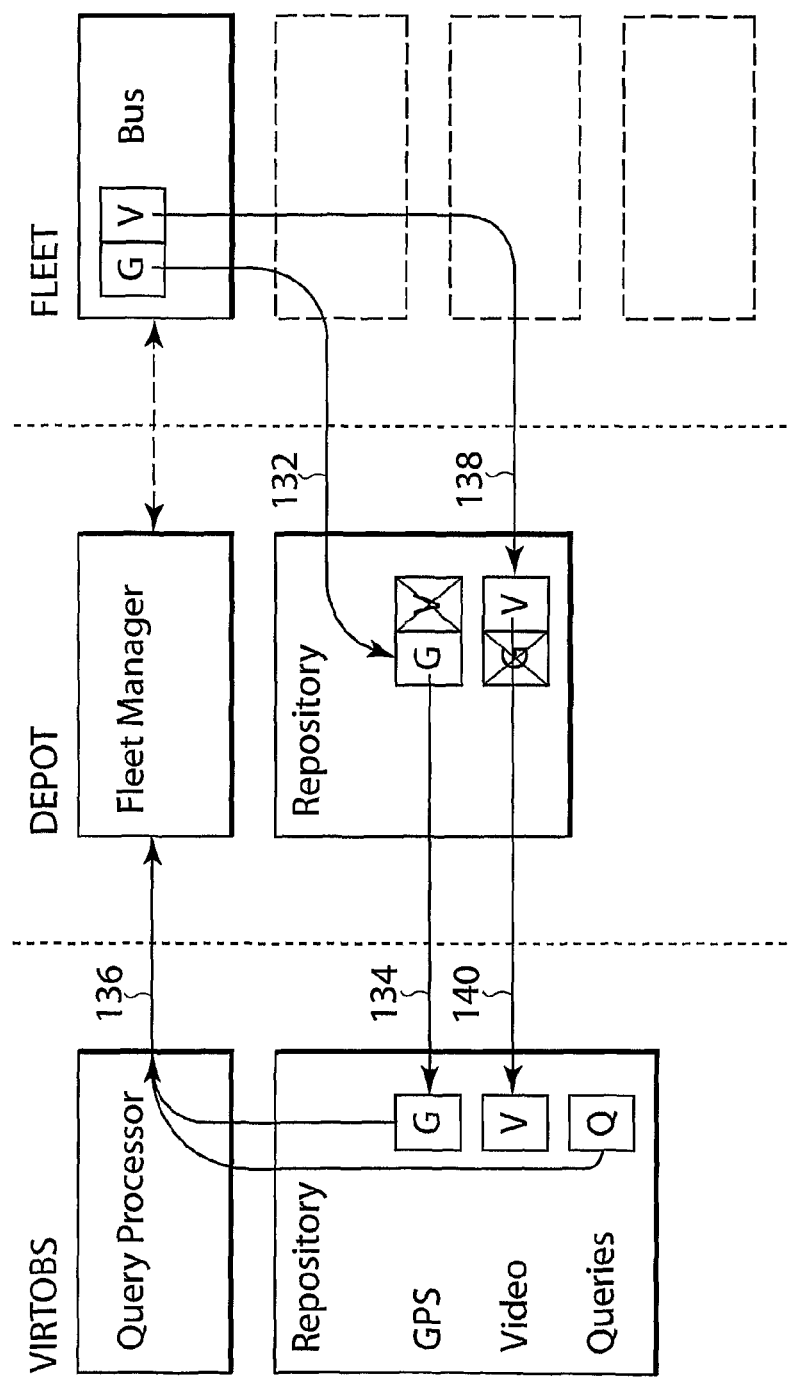
FIG. 14 is a schematic diagram exemplifying the implementation of the virtual observer system.

FIG. 14 shows how the system currently integrates with existing system at a bus operator's depot. Each bus is fitted with a GPS receiver and multiple cameras. A fleet management system manages the retrieval of data from the bus fleet. A standing request is placed in the system for all new GPS data. As buses come on-line GPS data is retrieved into the depot repository (132). A Virtual Observer process monitors the depot repository for new data and imports this into its own repository (134). All new trajectory data is then processed against all standing queries to produce a stream of camera track segments which is submitted as a batch of requests to the fleet management system (136). Later, the image data is retrieved to the depot repository (138) and is then imported into the repository of the system (140). The import process may filter out information that is present in the depot repository (eg. to select particular channels, or resample data). The repository is independent of vendor-specific data formats and protocols, although it does use these in the process of gathering data.

Most of the cameras record the activity of passengers inside the bus. In the event of a security incident (e.g., vandalism, assault or theft), the video collected from these cameras can be used as evidence in any investigation. A camera located at the entrance records a view of the face of each person that boards the bus. In addition, there may be one or more cameras that record the environment outside the bus. Typically, these cameras look out the front (and sometimes also the back) of the bus. Video collected from these cameras is used as evidence if the bus is involved in an accident with a vehicle or pedestrian. Here, we concentrate on data that is collected from these external cameras, which image the surrounding world as the bus moves about.

Each bus has seven cameras that record 24-bit colour images at 384×288 resolution. the global sampling rate is around 15 frames per second; this is distributed over the available cameras as required, giving approximately two images per second for each camera. The sampling rate can be increased for particular cameras by reducing the rate for others. Using JPEG compression, a typical image is around 15 Kb, giving an overall data rate of approximately 225 Kb per second. Typically, a bus operates around 85 hours per week, resulting in about 67 Gb of data per week. Each bus is fitted with 80 Gb of storage, meaning that images can be retained for 8 to 9 days.

When buses return to depot, data can be downloaded via wireless LAN. The average operational time is 12 to 15 hours per day, which leaves about 8 to 10 hours pre day for downloads. Each depot has about 100 buses, but these all converge at roughly the same time, outside of "rush hours". The wireless link is 802.11g but despite the 54 Mbps nominal bandwidth, the effective throughput is about 15 to 20 Mbps. This leaves, in the worst case, around 540 Mb of data per bus per day. This is sufficient to retrieve about five percent of the generated video data. It is therefore critical that the system is selective about what data is retrieved and what data is discarded.

Given the constraints of the sensor network, it is important that the system collect data based on demand. Rules are used to determine what data needs to be systematically recorded. Currently, the focus is on the internal security cameras and existing rules select video according to time and location. For example, at nightspots or areas where trouble is expected video data is routinely recorded at certain times of day. For external cameras, these constraints could be based on desired spatio-temporal resolution at different places and times. Virtual observers provide one other mechanism for regulating data collection. Each observer indicates an area of interest that may be stable over long periods of time. Data around these points should always be collected at high resolution in time and space.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A system for reconstructing a scene observed by a virtual observer in a wide area video surveillance network comprising:
   (a) plural mobile video cameras mounted on different vehicles that move in the wide area video surveillance network, the plural mobile video cameras having an external view, and wherein each segment or frame of video recorded by the plural mobile video cameras is stored together with corresponding trajectory parameters including a time of the segment or frame of video, a spatial position of a first camera of the plural mobile video cameras, orientation of the first camera, resolution of the first camera and field of view of the first camera;
   (b) a computer to recall segments or frames of the stored video in response to receiving one or more queries that include observation parameters, so as to enable a view from the virtual observer representing an imaginary camera located at a point in the wide area video surveillance network, the view being defined by the observation parameters and the observation parameters including a source position of the imaginary camera, orientation of the imaginary camera, resolution of the imaginary camera, field of view of the imaginary camera, and visibility radius of the field of view of the imaginary camera by synthesizing together recalled segments or frames that:
      (i) were recorded at different times by the plural mobile video cameras mounted on the different vehicles, when the different vehicles pass through the virtual observer, and
      (ii) have trajectory parameters that match the observation parameters, wherein the synthesizing together the recalled segments or frames includes an operation to merge the recalled segments or frames; and (c) a monitor to display the view from the virtual observer.

2. The system according to claim 1, wherein the view: from a panoramic view where the desired field of view is wider than the camera view, comprising multiple images taken at different times combined to give a wide-angle perspective view.

3. The system according to claim 2, wherein the view is a view from a "time-lapse" view showing how a view of a place changes over time.

4. The system according to claim 2, wherein the view is a view from a view of a particular object or landmark.

5. The system according to claim 2, wherein the view is selected on the basis of multiple spatial, temporal and geometric constraints.

6. The system according to claim 1, wherein there are also static cameras in the wide area video surveillance network.

7. A method of reconstructing a scene observed by a virtual observer in a wide area video surveillance network, comprising the following steps:

receiving one or more queries including observation parameters;

recalling stored segments or frames of video based on the one or more queries, wherein the stored segments or frames of video are recorded by a plurality of mobile video cameras having an external view and mounted on different vehicles that move in the wide area video surveillance network, and wherein each segment or frame of video recorded by the plurality of mobile video cameras is stored together with corresponding trajectory parameters including a time of the segment or frame of video, a spatial position of a first camera of the plurality of mobile video cameras, orientation of the first camera, resolution of the first camera and field of view of the first camera; and constructing a view to be displayed from a virtual observer representing an imaginary camera located at a point in the wide area video surveillance network given queried observation parameters including a source position of the imaginary camera, orientation of the imaginary camera, resolution of the imaginary camera, field of view of the imaginary camera, and visibility radius of the field of view of the imaginary camera, wherein the view is constructed by synthesizing together recalled video segments or frames that:

(i) were recorded at different times by the plurality of mobile video cameras mounted on the different vehicles, when the different vehicles pass through the virtual observer, and (ii) have trajectory parameters that match the observation parameters and wherein the synthesizing together the recalled segments or frames includes an operation to merge the recalled segments or frames.

8. A method according to claim 7, wherein at least one query defines a closest observation query that returns a segments or frame taken from the closest point to a defined location.

9. A method according to claim 7, wherein the view displayed is updated from time to time.

10. The method according to claim 7, wherein at least one query defines a view towards a place that returns segments or frames that view a defined location.

11. The method according to claim 7, wherein at least one query defines a view from a place that returns segments or frames looking outward from a defined location.

12. The method according to claim 7, wherein at least one query defines a view of a large spatial region that returns segments or frames captured in the region.

* * * * *